United States Patent [19]

Borttscheller et al.

[11] Patent Number: 5,404,741

[45] Date of Patent: Apr. 11, 1995

[54] METHOD AND CUTTING TOOL FOR PRODUCING STEEL FIBERS

[75] Inventors: Michael Borttscheller, Dortmund; Bernd Hackforth, Herne, both of Germany

[73] Assignee: Vulkan-Harex Stahlfasertechnik GmbH & Co. KG, Herne, Germany

[21] Appl. No.: 951,105

[22] Filed: Sep. 25, 1992

[30] Foreign Application Priority Data

Mar. 13, 1992 [DE] Germany .................. 42 08 080.0

[51] Int. Cl.⁶ .............................................. B21D 28/00
[52] U.S. Cl. ........................................ 72/330; 72/326; 83/349
[58] Field of Search ............... 72/330, 337, 331, 326, 72/325; 83/349, 508, 42

[56] References Cited

U.S. PATENT DOCUMENTS

| 678,837 | 7/1901 | Griffin | 83/508 |
|---|---|---|---|
| 2,399,529 | 4/1946 | Willits | 83/349 |
| 3,935,775 | 2/1976 | Sato | 83/508 |
| 4,000,670 | 1/1977 | Fleetwood | 83/42 |
| 4,019,357 | 4/1977 | Gokyu | 72/330 |
| 4,960,020 | 10/1990 | Reinhard | 83/349 |

FOREIGN PATENT DOCUMENTS

| 2029535 | 5/1991 | Canada | 72/326 |
|---|---|---|---|
| 0087496 | 10/1985 | European Pat. Off. | |
| 133659 | 12/1977 | Japan | 72/330 |
| 1448494 | 9/1976 | United Kingdom | |

OTHER PUBLICATIONS

Marian Grondziel and Michael Borttscheller; Development of Steel Fibre and Steel-Fibre-Reinforced Concrete During the Past 10 Years in Europe; Jun. 90.

*Primary Examiner*—Daniel C. Crane
*Attorney, Agent, or Firm*—Robert W. Becker & Associates

[57] ABSTRACT

Steel fibers which commonly are comprised of a straight center section and S-shaped end sections are commonly produced in two manufacturing steps: In a first manufacturing step straight sheet steel strips are cut from sheet steel and the resulting steel fibers are then stamped to produce the desired final shape. A method is suggested which combines the stamping and cutting of the fibers into one single manufacturing step. For this purpose, the upper or lower cutting blades are provided with a respective cutting contour which corresponds to the desired final shape. The cutting edge contour has a parallel leading center section in the direction of cutting that is parallel to the surface of the sheet steel. The two end sections are recessed and have a wave-shape or flat S-shape. When using a rotating cutting tool the rotating roller may have axially adjacent individual groups of upper cutting blades so that from the end face of an undivided sheet steel a corresponding number of adjacent steel fibers may be produced in a combined stamping and cutting step.

11 Claims, 3 Drawing Sheets

METHOD AND CUTTING TOOL FOR PRODUCING STEEL FIBERS

BACKGROUND OF THE INVENTION

The present invention relates to a method for producing steel fibers to be used in cement-based or resin-based construction materials in which identical steel fibers are produced by sequentially cutting with a cutting tool from a moving sheet steel strip transverse to the direction of movement, whereby the resulting steel fibers have an essentially rectangular cross-section. The present invention further relates to a cutting tool for performing the method.

In the production of the aforementioned steel fibers it is known to cut in a first manufacturing step with a rotating cutting tool straight steel fibers from the end face of thinly rolled sheet steel and to form the ends of the thus manufactured steel fibers in a second manufacturing step by stamping or similar methods. In the above described method for producing steel fibers at least two different manufacturing devices are required. Furthermore, the manufacture is time-consuming and therefore expensive.

It is therefore an object of the present invention to provide a method for producing steel fibers in which steel fibers of the desired final shape are produced in a single manufacturing step. A further object of the present invention is to provide a suitable cutting tool for performing the aforementioned inventive method.

BRIEF DESCRIPTION OF THE DRAWINGS

This object and other objects and advantages of the present invention, will appear more clearly from the following specification in conjunction with the accompanying drawings, in which.

SUMMARY OF THE INVENTION

Figure 1:
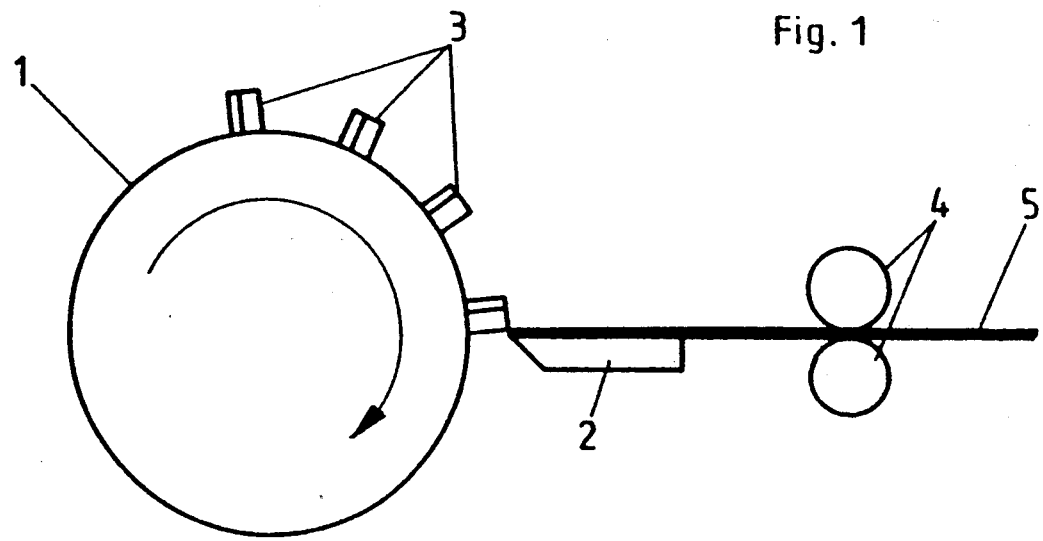
FIG. 1 is a side view of a rotating cutting tool according to the present invention with a plurality of upper cutting blades.
Figure 2:
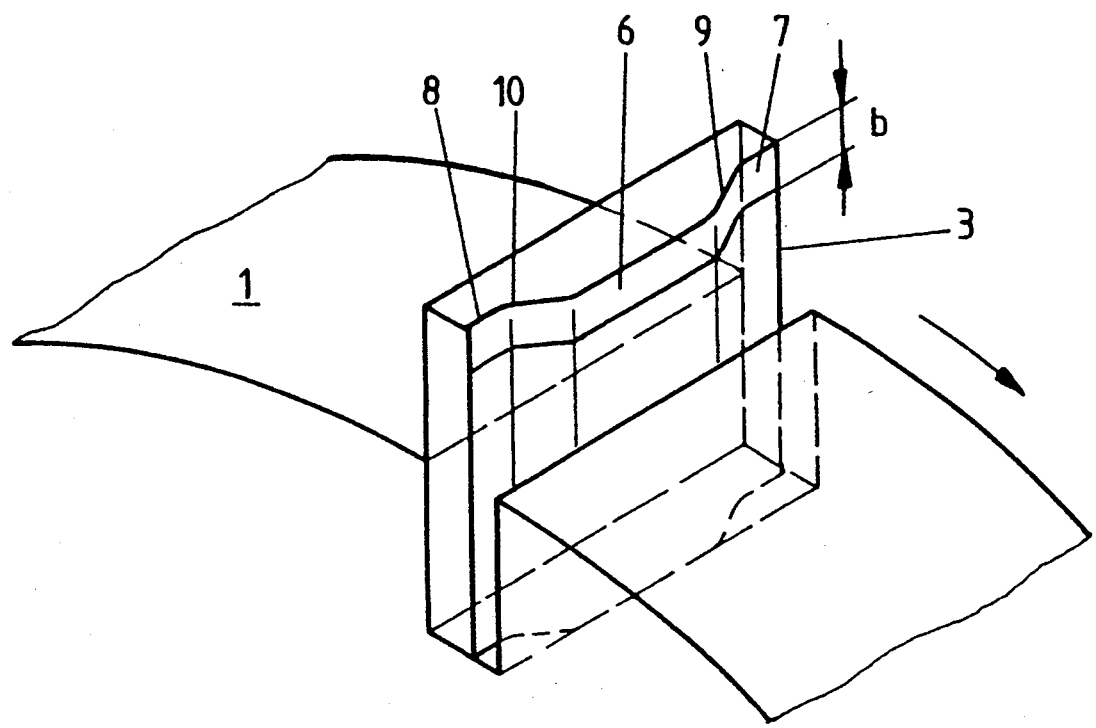
FIG. 2 in a perspective representation shows one individual upper cutting blade on an enlarged scale.
Figure 3:
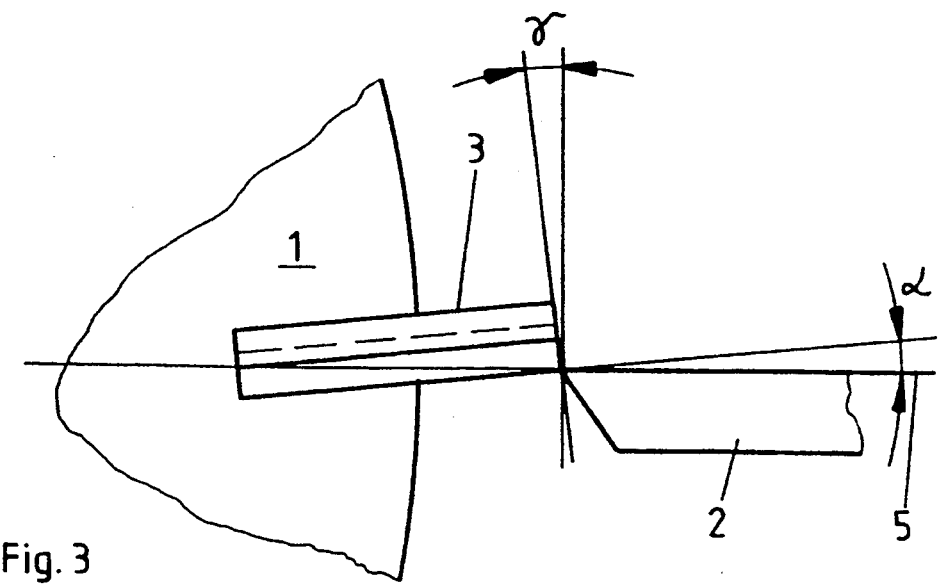
FIG. 3 shows a detailed side view of an upper cutting blade in a slanted arrangement.
Figure 4:
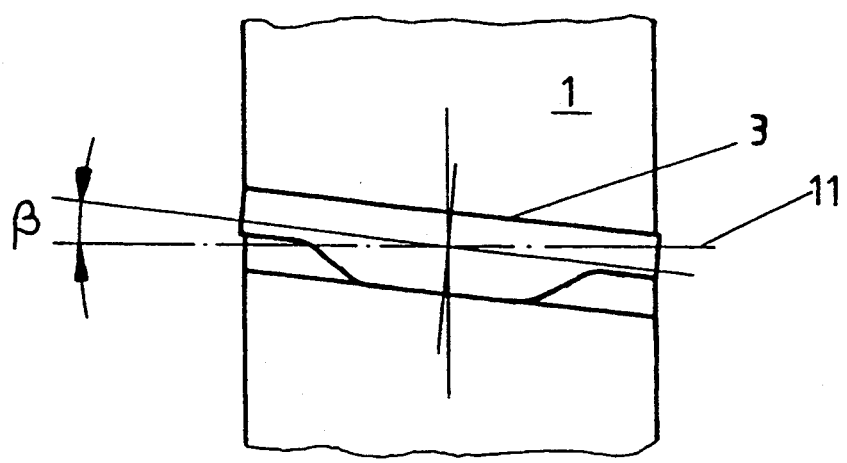
FIG. 4 shows an end view of an upper cutting blade.

The inventive method for producing steel fibers comprises the steps of:

producing in a simultaneous stamping and cutting step steel fibers of an identical shape, wherein the simultaneous stamping and cutting step comprises the following steps:

cutting sequentially with a cutting tool the steel fibers from an advancing sheet steel strip transverse to a direction of advancement of the sheet steel strip, the steel fibers having a central shaft section with bent end sections of an essentially rectangular cross-section and a constant width; and selecting cutting blades of the cutting tools such that their contour corresponds to the shape of the steel fibers.

It is the gist of the inventive method to provide cutting blades with a cutting edge contour that corresponds to the desired final shape of the steel fibers, i.e., steel fibers having a central straight shaft section and bent end sections, so that the steel fibers are produced as a finished product in a single combined stamping and cutting process.

The main advantage of the present invention is the fact that in contrast to commonly known methods for producing steel fibers the finished product can be produced in a single step instead of two subsequent manufacturing steps.

Preferably, the step of sequentially cutting further comprises the steps of providing a stationary lower cutting blade and providing a plurality of upper cutting blades, the upper cutting blades being identical and connected spaced from one another in the circumferential direction to a rotating roller of the cutting tool.

Advantageously, the method further comprises the step of advancing a longitudinally undivided steel sheet strip to the cutting tool, wherein at least two of the upper cutting blades are arranged axially adjacent to one another in one common plane. In an alternative, the method further comprises the step of advancing a longitudinally divided steel sheet strip to the cutting tool, wherein at least two of the upper cutting blades are arranged axially adjacent to one another in one common plane. Preferably, the cutting speed of the cutting tool is adjustable.

Accordingly, it is possible to advantageously perform a sequential cutting of steel fibers by using stationary lower cutting blades and a plurality of identical upper cutting blades which are connected to a rotating roller of the cutting tool spaced at a distance in the circumferential direction.

The method may further be performed such that a rotating cutting tool with at least two or more axially adjacently arranged cutting blades cut the steel fibers from an undivided (one-part) or a longitudinally divided sheet steel strip.

The inventive method is easily adaptable by varying the cutting speed and/or the cutting width of the cutting tool in a suitable manner.

In one embodiment of the inventive cutting tool for performing the inventive method, the tool is comprised of at least one movable upper cutting blade and at least one stationary lower cutting blade, with the contour of the upper cutting blade or of the lower cutting blade corresponding to the shape of the steel fibers.

Preferably, the lower cutting blade has a straight cutting edge and the upper cutting blade has a stamping and cutting edge that is comprised of a center section parallel to the surface of the sheet steel strip and end sections recessed relative to the center section, the center section and the end sections forming a wave-shaped contour, with the stamping and cutting edge having a stamping width that corresponds at least to the constant width of the steel fibers. For the commonly desired final shape of such steel fibers the profiling or contour of the cutting blades is comprised of a center section which in the cutting direction projects from the surface of the cutting tool and which is parallel to the surface of the sheet steel strip and two end sections which are recessed relative to the center section so that a wave-shape or a flat S-shape results whereby the stamping width corresponds to the desired width of the steel fibers.

Preferably, the cutting tool further comprises a rotating roller having a plurality of upper cutting blades connected thereto. Advantageously, the cutting edge of the upper cutting blades is tilted at a tilt angle $\beta$ relative to an axis of rotation of the rotating roller, the tilt angle $\beta 0$ may be as great as 30°. In the alternative, it is possible that the cutting edge of the lower cutting blade is tilted at a tilt angle $\beta 0$ relative to an axis of rotation of the rotating roller, the tilt angle being up to 30°.

In another embodiment of the present invention, at least two groups of upper cutting blades are arranged axially adjacent to one another such that the upper cutting blades are spaced at an identical distance relative to one another and such that the upper cutting blades of one group are staggered relative to the upper cutting blades of an adjacent group in a circumferential direction of the rotating roller by an arcuate distance y. In a further embodiment, the cutting tool comprises a plurality of lower cutting blades arranged in various cutting planes.

Preferably, a stamping and cutting edge of the upper cutting blade is slanted relative to the surface of the sheet steel strip such that at the moment of impact of the stamping and cutting edge at the sheet steel strip a radially outwardly open cutting angle of up to 15° is present.

By providing the aforedescribed tilt angle of up to 30° the steel fibers are cut from the sheet steel strip in the fashion of a scissor cut. With this embodiment the cutting step of a steel fiber begins at one longitudinal side of the sheet steel strip and advances from here to the opposite longitudinal side until the steel fiber has been completely cut off. Accordingly, steel fibers with a certain twisting about their longitudinal axis result which have the additional advantage of an increased resistance to withdrawal from the cement or resin matrix in which the steel fibers are embedded.

The arrangement of individual groups of upper cutting blades adjacent to one another and staggered by an arcuate distance y with a corresponding lower cutting blade arrangement provides for a method of cutting steel fibers from an undivided sheet steel strip to the desired length. Accordingly, a division in the longitudinal direction of the sheet steel strip corresponding to the length of the steel fibers is not required. The separation of the sheet steel strip in the longitudinal direction is achieved with the end face of the upper cutting blade which is staggered relative to the adjacent upper cutting blade by the arcuate distance y.

DESCRIPTION OF PREFERRED EMBODIMENTS

The present invention will now be described in detail with the aid of specific embodiments utilizing FIGS. 1 through 6.

FIG. 1 shows in a schematic representation in a side view the manufacture of steel fibers with a rotating cutting roller 1 in connection with a stationary lower cutting blade 2. A plurality of upper cutting blades 3 is connected to the rotating roller 1 spaced at a uniform distance relative to one another about its circumference. With the aid of a suitable feeding device, represented by two counter rotating feeding rollers 4 in the drawing FIG. 1, a sheet steel strip 5 of the desired thickness and width is continuously advanced to the cutting tool. The desired width of the finished steel fibers is adjusted via the speed (revolutions per minute) of the feed rollers 4. The stationary lower cutting blade 2 is chamfered in a downward direction at the cutting edge, as can be seen in FIG. 1.

Each individual upper cutting blade 3 is essentially embodied as a rectangular plate having a suitable profiling at the loading surface in the direction of rotation. In the shown embodiment the surface is provided with a straight center section 6, parallel to the axis of rotation, and two parallel shorter end sections 7 and 8. The center section 6 and the end sections 7 and 8 are connected by respective intermediate sections 9, 10 which have a flat S-shape. The thus selected surface contour determines the shape of the finished steel fibers.

Before starting the cutting process the sheet steel strip 5 is advanced corresponding to the desired width of the steel fiber so that the cutting blade 3 contacts with the width b the sheet steel. The separation of the individual steel fibers is then carried out in a combined (simultaneous) stamping and cutting step.

In order to prevent deformations during the cutting and stamping process, the individual cutting blades 3 are not positioned exactly radially, but slightly slanted relative to the radial plane at the rotating roller 1. Accordingly, the surface of the cutting blade 3 at the moment of impact on the sheet steel strip 5 extends at an angle of slant $\alpha$ which for example may be 5°. At the same time, due to the slanting at the end face of the cutting blade 3 an identical cutting angle $\gamma$ results.

The cutting process and also the forming (stamping) step of the steel fibers may be further influenced by positioning the cutting blade 3 relative to the axis of rotation 11 of the rotating roller 1 not in parallel, but at a tilt. The resulting tilt angle $\alpha$ may be as great as 30°. Instead of tilting the upper cutting blades 3 the lower cutting blade 2 may be positioned with a respective tilt relative to the axis of rotation 11.

Figure 5:
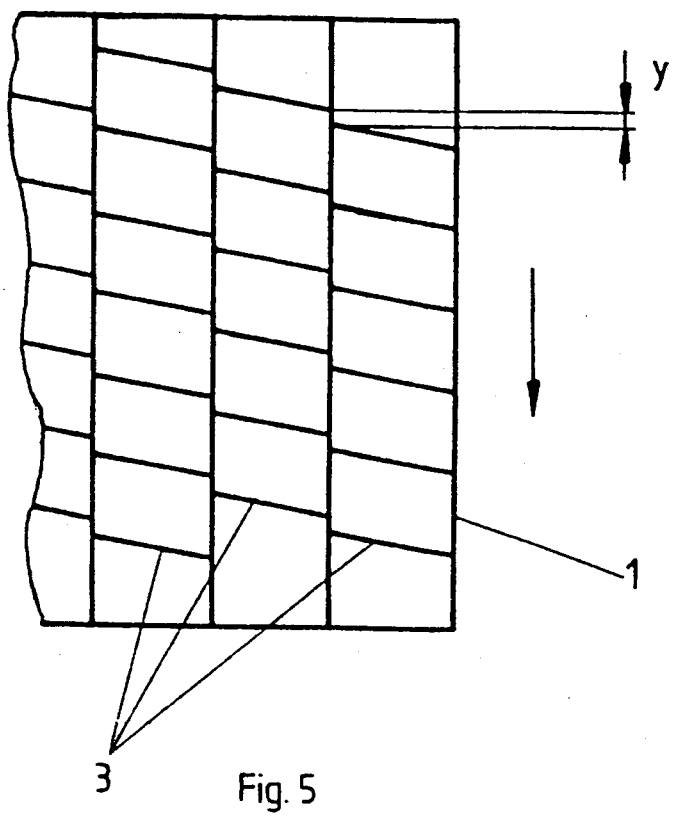
FIG. 5 shows a developed projection of a rotating cutting tool with groups of upper cutting blades arranged axially adjacent to one another.

The output of a rotating cutting roller may be substantially increased when at the surface of the rotating roller in the axial direction two or more groups of cutting blades 3 are arranged immediately adjacent to one another as is schematically represented in FIG. 5.

The cutting blades 3 in neighboring groups are staggered relative to one another in the circumferential direction. This staggering is selected such that between the final cutting portion of the edge of the cutting blade 3 of a previous group and the starting portion of an edge of the cutting blade 3 of a neighboring group a distance y is provided. This distance, depending on the size of the rotating cutting roller and of the steel fibers to be produced, may be a couple of mm.

This arrangement in connection with the arrangement of one or more lower cutting blades 2 provides for the possibility of cutting adjacently arranged steel fibers from a one-part (undivided) sheet steel strip 5 without having to divide the sheet steel strip in its longitudinal direction according to the number of steel fibers to be produced in the transverse direction of the sheet steel. Due to the staggered arrangement of the individual cutting blades 3 with a fixed distance y it is ensured that at the end of a cutting step transverse to the direction of advancement of the sheet steel strip at the end face between the now finished steel fiber and the steel fiber to be generated next in the transverse direction a separation parallel to the direction of advancement is possible.

Figure 6:
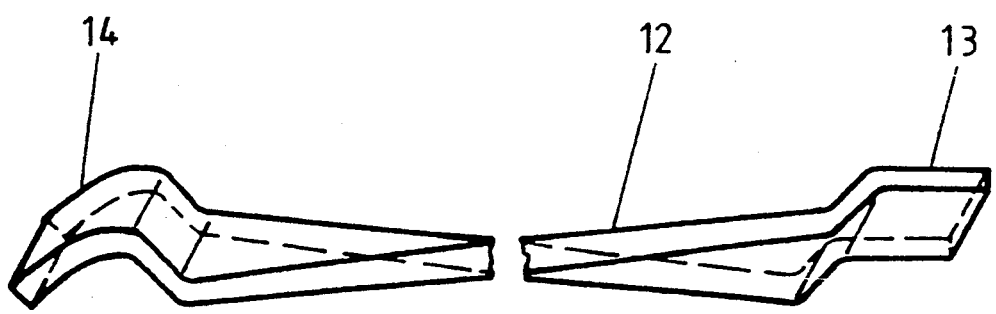
FIG. 6 shows a finished steel fiber which is twisted about its longitudinal axis and has two differently shaped end sections.

FIG. 6 shows an example of a finished steel fiber which is longitudinally twisted about its straight central shaft section 12. The right half of the drawing shows a formed end section 13 with straight edges corresponding to the contour of the cutting blade 3 according to FIG. 3. The left half of the drawing shows an end section 14 which is bent so that over all a flat S-shape results. The radii of the transitions may be 0.5 to 3.5 mm depending on the thickness of the sheet steel. The cross-section of the steel fiber in the embodiment represented in the drawings is rectangular. The length of such a steel fiber may be up to 50 mm or more.

The present invention is, of course, in no way restricted to the specific disclosure of the specification and drawings, but also encompasses any modifications within the scope of the appended claims.

What we claim is:

1. A method for producing steel fibers to be used in cement-based and resin-based construction materials, said method comprising the steps of:
    producing in a simultaneous stamping and cutting step steel fibers of an identical shape, wherein said simultaneous stamping and cutting step comprises the following steps:
    a) providing a cutting tool with a stationary lower cutting blade and a plurality of upper cutting blades, the upper cutting blades being identical and connected spaced from one another in the circumferential direction to a rotating roller of said cutting tool;
    b) selecting said upper cutting blades of said cutting tool such that their contour corresponds to said shape of said steel fibers;
    c) cutting sequentially with said cutting tool said steel fibers from an advancing sheet steel strip transverse to a direction of advancement of said sheet steel strip, said steel fibers having a central straight shaft section with bent end sections of an essentially rectangular cross-section and a constant width; and
    d) imparting said shape to one said steel fiber with one said upper cutting blade simultaneously to cutting said fiber with said one upper cutting blade.

2. A method according to claim 1, further comprising the step of advancing a longitudinally undivided steel sheet strip to the cutting tool, and wherein at least two of the upper cutting blades are arranged axially adjacent to one another in one common plane.

3. A method according to claim 1, further comprising the step of feeding a longitudinally divided steel sheet strip to the cutting tool, and wherein at least two of the upper cutting blades are arranged axially adjacent to one another in one common plane.

4. A method according to claim 1, wherein the cutting speed of the cutting tool is adjustable.

5. A cutting tool for performing the method according to claim 1, comprised of:
    a plurality of movable upper cutting blades and a stationary lower cutting blade, with the contour of said upper cutting blades corresponding to said shape of said steel fibers.

6. A cutting tool according to claim 5, wherein said lower cutting blade has a straight cutting edge, and wherein said upper cutting blade has a stamping and cutting edge that is comprised of a center section parallel to the surface of the sheet steel strip and end sections recessed relative to said center section, said center section and said end sections forming a wave-shaped contour, and with said stamping and cutting edge having a stamping width that corresponds at least to said constant width of said steel fibers.

7. A cutting tool according to claim 5, wherein a cutting edge of said upper cutting blade is tilted at a tilt angle $\beta$ relative to an axis of rotation of said rotating roller, said tilt angle $\beta$ being up to 30°.

8. A cutting tool according to claim 5, wherein a cutting edge of said lower cutting blade is tilted at a tilt angle $\beta$ relative to an axis of rotation of said rotating roller, said tilt angle being up to 30°.

9. A cutting tool according to claim 5, wherein at least two groups of upper cutting blades are arranged axially adjacent to one another such said upper cutting blades are spaced at an identical distance relative to one another and such that said upper cutting blades of one said group are staggered relative to said upper cutting blades of an adjacent one of said groups in a circumferential direction of said rotating roller by an arcuate distance y.

10. A cutting tool according to claim 9, comprising a plurality of said lower cutting blades arranged in various cutting planes.

11. A cutting tool according to claim 5, wherein a stamping and cutting edge of said upper cutting blade is slanted relative to the surface of the sheet steel strip such that at the moment of impact of said stamping and cutting edge at sheet steel strip a radially outwardly open cutting angle of up to 15° is present.

* * * * *